Figures 1, 2:
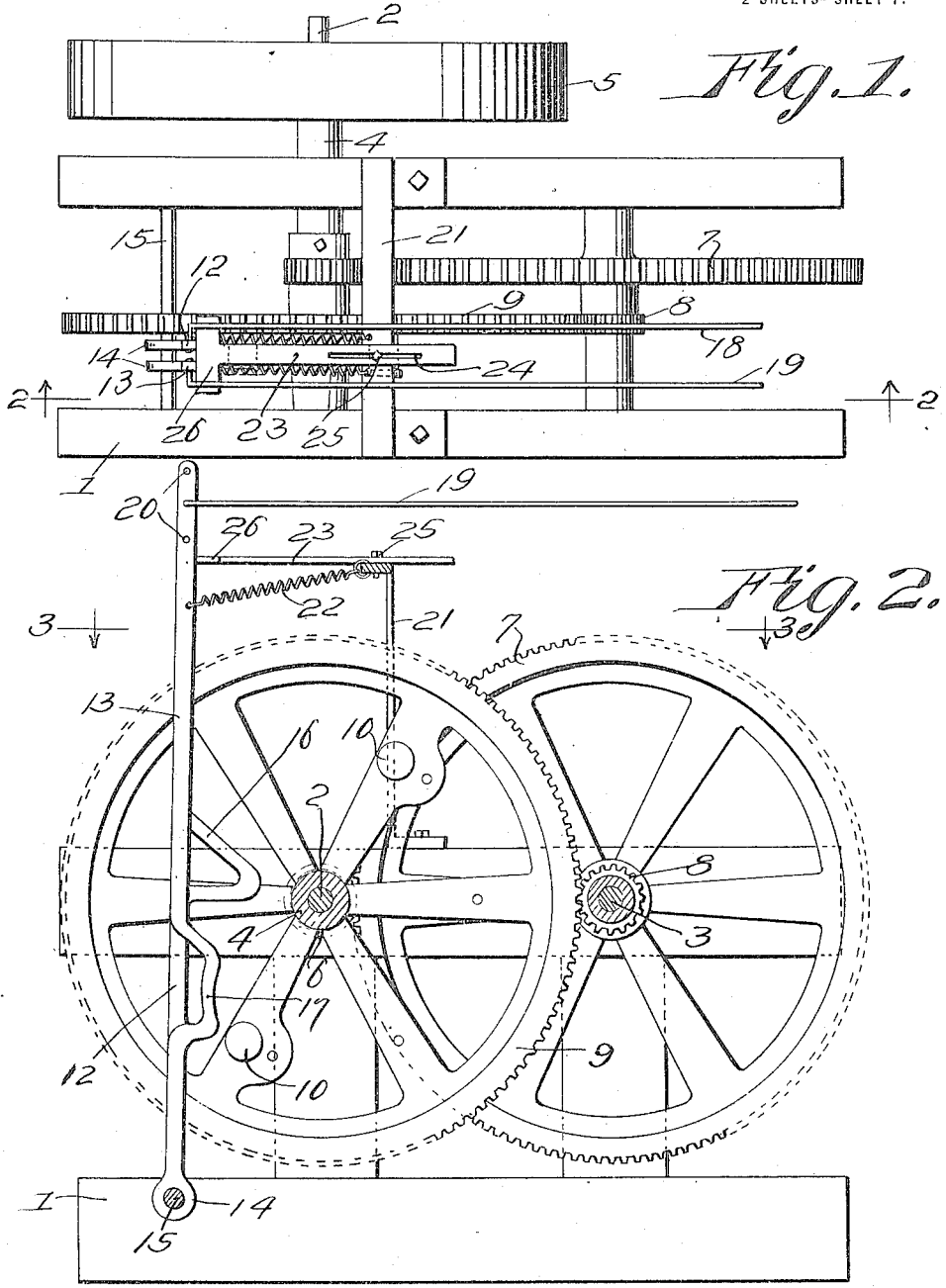

R. V. TUCKER.
MECHANICAL MOVEMENT.
APPLICATION FILED MAY 5, 1916.

1,207,241.

Patented Dec. 5, 1916.
2 SHEETS—SHEET 1.

Witnesses

Roger V. Tucker,
Inventor by
Attorneys

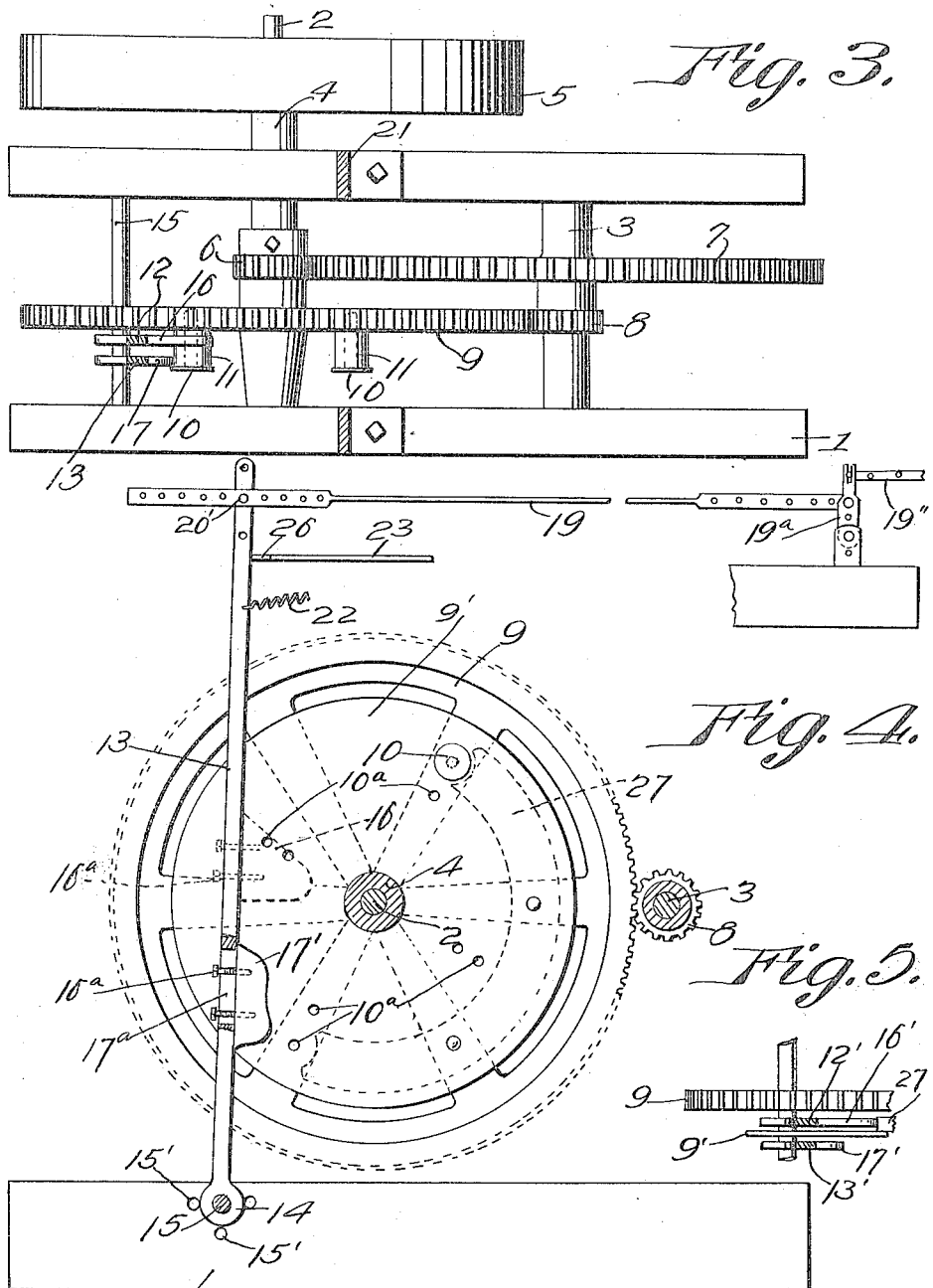

UNITED STATES PATENT OFFICE.

ROGER V. TUCKER, OF BYERS, TEXAS.

MECHANICAL MOVEMENT.

1,207,241.  Specification of Letters Patent.  Patented Dec. 5, 1916.

Application filed May 5, 1916. Serial No. 95,647.

*To all whom it may concern:*

Be it known that I, ROGER V. TUCKER, a citizen of the United States, residing at Byers, in the county of Clay and State of Texas, have invented a new and useful Mechanical Movement, of which the following is a specification.

The present invention is a mechanical movement adapted especially for operating a gin automatically, and aims to provide a novel and improved mechanism for automatically operating a gin or similar machine, to relieve the operator of this duty, thereby saving labor and expense.

It is the object of the invention to provide an appliance of the nature indicated which when operated continuously, will intermittently operate two devices in a special manner.

It is also the object of the invention to provide a mechanism of the character specified which is comparatively simple, compact and inexpensive in construction, which can be readily applied to various machines, and which has improved details to enhance the utility and efficiency thereof.

With the foregoing and other objects in view which will appear as the descripti proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a plan view of the mechanism. Fig. 2 is a longitudinal vertical section taken on the line 2—2 of Fig. 1. Fig. 3 is a horizontal section taken on the line 3—3 of Fig. 2. Fig. 4 is a fragmental view of the mechanism showing certain modifications. Fig. 5 is a detail of the modified form.

In carrying out the invention, there is employed a suitable frame 1, constructed of wood, metal or other material, and carrying a pair of transverse shafts 2 and 3, which are preferably disposed in the same horizontal plane. A tubular shaft 4 is mounted for rotation upon the shaft 2, and has attached to its outer end a pulley wheel 5 for the engagement of a belt, although it is to be understood that the tubular shaft 4 can be driven in any suitable manner so that it will rotate continuously during the operation of the gin. A pinion 6 is secured to the inner end of the tubular shaft 4 and meshes with a gear wheel 7 rotatable upon the shaft 3 and having attached thereto in any suitable manner, a pinion 8 which meshes with a gear wheel 9 mounted for rotation upon the shaft 2. This provides a gear train, whereby the gear wheel 9 will be rotated at the proper velocity and with sufficient power to operate the gin, although various means can be employed for rotating the wheel 9. This wheel 9 is provided upon one face with a pair of outstanding pintles or studs 10 upon which rollers 11 are rotatable, said rollers being diametrically opposite one another, and although two rollers are used in the mechanism illustrated, any number of them can be employed, depending upon the circumstances.

The rollers 11 operate a pair of levers 12 and 13 which are provided at their lower ends with eyes or tubular portions 14 journaled for rocking movement upon a transverse rod 15 carried by the frame. The levers 12—13 project upwardly across the face of the wheel 9 which has the rollers projecting therefrom, and the lever 12 has the cam 16 projecting therefrom in the path of the rollers, while the lever 13 has a cam 17 projecting therefrom in the path of said rollers, but the cam 17 is spaced below the cam 16 to be operated after the cam 16. The levers 12—13 are preferably formed from rods, and are bent between their ends to provide the cams. The cams are of proper shape in order that the levers will be moved properly by the rollers.

The upper free ends of the levers are operatively connected with the gin, and for this purpose, a rod or link 18 is connected to the lever 12 and can be connected to an apron board, hull dumping or other device of a gin breast or the like, while the lever 13 has connected thereto a rod or link 19 which can be connected to a feeder board or other device of the gin or other machine. The levers are provided with apertures 20 for the engagement of the rods, whereby said rods can be adjusted if necessary or desirable.

An arch 21 is attached to the frame and passes over the gears, and coiled retractile springs 22 connect the levers 12—13 and the upper portion of the arch, whereby to swing the levers to normal position with the cams lying in the path of the rollers.

In order to properly limit the movement of the levers when returned to normal position by the springs, a bar 23 is disposed upon the upper portion of the arch 21 and has a longitudinal slot 24 through which a clamping screw 25 extends, said screw being threaded into the upper portion of the arch 21, to clamp the bar 23 in any longitudinally adjusted position. That end of the bar 23 adjacent the levers has a T-head 26 forming a stop against which the levers rest when they are in normal position. The bar 23 can be readily adjusted, to adjust the positions of the levers when they are in idle or normal position.

In operation, as the wheel 9 rotates, the rollers engage the cams in succession to oscillate the levers. The wheel 9 rotates counter clockwise, as seen in Fig. 2, whereby each roller first engages the cam 16, and forces the lever 12 away from the arch 21, thereby pulling the rod 18 to operate the respective device of the gin or other machine. After the roller has passed the cam 16, the lever 12 is returned to normal position by its spring 22, and the roller then engages the cam 17, forcing the lever 13 away from the arch 21, so that the rod 19 is pulled to operate the other device. The roller then leaves the cam 17, so that the lever 13 is returned to normal position, and the levers 12—13 then remain in normal position for a period of time, until the next roller operates the cams. The machine to which rods 18—19 are connected is thus operated intermittently, without the attention of an operator.

In the modified form shown in Figs. 4 and 5, a disk 9', which can also be denominated a wheel, is attached to and spaced from the gear wheel to be rotated therewith, and the disk 9' is provided at different points with apertures 10$^a$ for the attachment of the pintles or studs 10'. Said pintles or studs can be disposed upon opposite sides of said disk to coöperate with the levers 12' and 13' which are disposed upon opposite sides of said disk, said studs being adjustable to different positions to change the operation of the levers. The fulcrum rod 15 of the levers may also be placed in different apertures 15' of the frame to change the operation of the levers. The cams 16' and 17' of the levers 12' and 13', respectively, are adjustable longitudinally of the levers, each lever being provided with a longitudinal slot 17$^a$ in which clamping screws 16$^a$ are slidable, said screws being threadedly engaged with the respective cam. The cams can thus be adjusted as well as the levers and studs. The stud or studs upon the rear or inner face of the disk 9' operate the lever 12', while the stud or studs upon the outer side of the disk 9' operate the lever 13', and the studs upon the opposite sides of the disks can be arranged in various positions. Figs. 4 and 5 also illustrate the use of an arcuate track or strip 27 attached to the inner side of the disk 9' so as to follow one of the studs or rollers 10', said strip extending through about an arc of 180 degrees. After the cam 16' is moved by the respective stud 10', the strip 27 will hold said cam in displaced position, thereby holding the lever 12' to maintain the respective device in one position for about one-half of a revolution of the wheel 9, and during this time, the respective stud or roller can engage and disengage the cam 17' so that the other device is operated during the interval that the strip 27 holds the lever 12'. Fig. 4 illustrates the rod 19' adjustably connected, as at 20', to the lever 13', and also adjustably connected to an adjustably mounted lever 19$^a$, another rod 19'' being connected to the lever 19$^a$ and extending into the gin, the lever 19$^a$ transmitting the motion between the rods 19' and 19''.

Having thus described the invention, what is claimed as new is:

1. A mechanism of the character described embodying a rotatable wheel having an outstanding member, a pair of levers with which said member is engageable in succession to be swung thereby, and means adapted to be carried by the wheel for holding one lever in displaced position when moved by said member.

2. A mechanism of the character described embodying a frame, a rotatable wheel carried thereby having an outstanding member, a pair of levers fulcrumed to the frame and adapted to be operated in succession by said member, a stop carried by the frame against which said levers are adapted to rest, and springs for moving said levers against said stop.

3. A mechanism of the character described, comprising a frame, a rotatable wheel carried thereby having an outstanding member at one side, a lever having a cam disposed in the path of said member to be moved thereby, said lever being fulcrumed to the frame, an adjustable stop carried by the frame against which said lever rests when in normal position, and a spring for moving the lever against said stop.

4. A mechanism of the character described, comprising a frame, a rotatable wheel carried thereby having an outstanding member, a pair of levers fulcrumed to the frame to be operated in succession by said member, an arch carried by the frame, springs connecting said levers and arch, and an adjustable bar carried by said arch having a T-head against which said levers are moved by the springs.

5. A mechanism of the character described comprising a rotatable wheel having an outstanding member, a pair of levers adapted to be engaged in succession by said member, and an arcuate track carried by said wheel in rear of said member for holding one lever in displaced position.

6. A mechanism of the character described comprising a rotatable wheel having an outstanding member, a pair of levers having cams to be engaged in succession by said member, and an arcuate track carried by the wheel in rear of said member for holding one cam in displaced position.

In testimony that I claim the foregoing as my own, I have hereto affixed my signature in the presence of two witnesses.

ROGER V. TUCKER.

Witnesses:
    JAY WALLING,
    LEO J. CURTIS.

Copies of this patent may be obtained for five cents each, by addressing the "Commissioner of Patents, Washington, D. C."